(12) United States Patent
Roming et al.

(10) Patent No.: US 9,592,900 B2
(45) Date of Patent: Mar. 14, 2017

(54) METHOD FOR THE PRODUCTION OF A CONNECTING ELEMENT, CONNECTING ELEMENT, AND AIRCRAFT OR SPACECRAFT

(71) Applicant: Airbus Operations GmbH, Hamburg (DE)

(72) Inventors: Thorsten Roming, Himmelpforten (DE); Volker Reye, Hamburg (DE); Stefan Tacke, Buxtehude (DE); Thorsten Jobs, Hamburg (DE); Stephan Tiede, Immenstaad (DE)

(73) Assignee: Airbus Operations GmbH, Hamburg (DE)

( * ) Notice: Subject to any disclaimer, the term of this patent is extended or adjusted under 35 U.S.C. 154(b) by 289 days.

(21) Appl. No.: 14/134,242

(22) Filed: Dec. 19, 2013

(65) Prior Publication Data

US 2014/0166811 A1 Jun. 19, 2014

Related U.S. Application Data

(60) Provisional application No. 61/739,032, filed on Dec. 19, 2012.

(30) Foreign Application Priority Data

Dec. 19, 2012 (EP) .................................... 12198015

(51) Int. Cl.
*B64C 1/12* (2006.01)
*B64C 1/06* (2006.01)
(Continued)

(52) U.S. Cl.
CPC ................ *B64C 1/12* (2013.01); *B64C 1/061* (2013.01); *B64C 3/26* (2013.01); *E04C 3/28* (2013.01); *Y10T 29/49622* (2015.01)

(58) Field of Classification Search
CPC ............ B64C 1/12; B64C 1/061; B64C 1/064
See application file for complete search history.

(56) References Cited

U.S. PATENT DOCUMENTS 5,307,601 A 5/1994 McCracken
5,426,906 A 6/1995 McCracken
(Continued)

FOREIGN PATENT DOCUMENTS

| EP | 0554606 | 8/1993 |
|----|---------|--------|
| EP | 2404824 | 1/2012 |
| GB | 2441753 | 3/2008 |

OTHER PUBLICATIONS

European Search Report, Aug. 1, 2013.

*Primary Examiner* — Philip J Bonzell
*Assistant Examiner* — Michael Kreiner
(74) *Attorney, Agent, or Firm* — Greer, Burns & Crain, Ltd.

(57) ABSTRACT

A method for producing a connecting element for at least two components of an aircraft structure. A hollow initial profile is formed comprising a wall following a closed path in the initial profile cross-section. The wall has a first, second and third section. Material is removed from the wall in one region of the initial profile, to obtain one opening in the one region, the opening extending at least partially within the first section. A portion of the second section and a portion of the third section form part of the connecting element and are each formed so as to be adapted to at least partially abut against the structure. The one opening is formed such that material initially forming part of the wall in the first section and remaining after the formation of the opening forms a stabilizing section connecting the portions of the second and third sections.

5 Claims, 3 Drawing Sheets

(51) Int. Cl.
*B64C 3/26* (2006.01)
*E04C 3/28* (2006.01)

(56) References Cited

U.S. PATENT DOCUMENTS

| | | | |
|---|---|---|---|
| 2008/0277057 A1* | 11/2008 | Montgomery | B32B 5/26 |
| | | | 156/307.1 |
| 2010/0025529 A1 | 2/2010 | Perry et al. | |
| 2012/0006940 A1 | 1/2012 | Mialhe et al. | |
| 2012/0217352 A1 | 8/2012 | Gya et al. | |
| 2012/0223187 A1* | 9/2012 | Kismarton | B64C 1/068 |
| | | | 244/120 |

* cited by examiner

METHOD FOR THE PRODUCTION OF A CONNECTING ELEMENT, CONNECTING ELEMENT, AND AIRCRAFT OR SPACECRAFT

CROSS-REFERENCES TO RELATED APPLICATIONS

This application claims priority to and benefit from the European Patent Application No. 12 198 015, filed Dec. 19, 2012, and of the U.S. Provisional Patent Application No. 61/739,032, filed Dec. 19, 2012, the entire disclosures of which are incorporated herein by way of reference.

FIELD OF THE INVENTION

The present invention relates to connecting elements intended for connecting two or more components within an aircraft structure or a spacecraft structure to each other. Furthermore, the invention is concerned with a method for the production of such a connecting element, as well as with an aircraft or a spacecraft comprising structural components connected by means of such a connecting element.

BACKGROUND OF THE INVENTION

Although the invention may be useful for connecting various structural components of aircraft or spacecraft, the present invention will be explained in the following in relation to a mechanical connection established between structural components of an aircraft fuselage structure, and in particular in relation to the mechanical connection of a frame to a stringer and/or to a skin of such a fuselage structure.

According to a conventional manner of forming an aircraft fuselage structure, a primary structure of the aircraft fuselage is formed with a skin stiffened by a plurality of frames and a plurality of stringers. The frames are used for stiffening the fuselage in a circumferential direction thereof, while the stringers are used for supporting the skin and stiffening the same in a longitudinal direction of the fuselage. The stringers may be connected directly to the skin and may be shaped as profiles of different cross-section, the cross-section having, for example, an L-shape, a T-shape or Ω-shape. In contrast, the frames may be shaped as Z-profiles or C-profiles.

In such a construction, it is desired to connect the frames to the skin either directly or via feet of the stringers acting as intermediate elements. This connection can be achieved, for example, according to the concept of the so-called differential frame, which means that the frame crosses above the stringer heads and is connected to the skin by means of additional, separate connecting elements, the so-called "clips". Differential frames may be advantageous regarding the compensation of manufacturing tolerances of the individual workpieces during assembly.

In order to achieve a more lightweight aircraft fuselage structure, the fuselage skin, the frames and the stringers can be produced from a fiber-reinforced composite material, for example, from a synthetic material reinforced with carbon fibers. In this case, it is desirable, when the differential frame concept is chosen, to connect the frames to the skin by means of "clips" which are made from a composite material as well. Thereby, the weight of the fuselage may also be further reduced.

One example of an angled component for linking a fuselage skin to a ring frame of an aircraft is described in DE 10 2008 020 347 B4. This component is produced from a blank that has been cut out of a plane plate of a fiber-reinforced thermoplastic synthetic material. This blank is first heated in order to make the thermoplastic matrix of the fiber-reinforced synthetic material become soft. Then, the blank is deformed in one step along at least three folding lines in order to form an angled connecting component comprising an integrated stabilizing flange. The stabilizing flange is intended to enable the angled connecting component to support forces acting along the longitudinal direction of the aircraft fuselage, which is usually the direction parallel to the stringers. After the process of deforming the fiber-reinforced thermoplastic blank, the resulting workpiece, after cooling, is subjected to a cutting procedure to give the connecting component its desired final shape.

Although an angled connecting component as described in DE 10 2008 020 347 B4 may contribute to reducing the weight of an aircraft fuselage structure, the production of this conventional connecting component is complex, time-consuming and costly. This is due, in particular, to the need for different tools for deforming the blank after heating it, the tools being specially adapted to the shape of a particular connecting component or "clip". Beyond this, the production of the conventional connecting components made of fiber-reinforced thermoplastic synthetic material requires a first cutting procedure in order to obtain the blank from the plate-shaped plane material, and then requires a further, complex three-dimensional cutting process for trimming the workpiece to its desired final dimensions and shape.

All this leads to a time-consuming production process, which is particularly undesirable because a great number of connecting components are needed within the structure of a complete aircraft.

As can be appreciated from the above, there is a need for a connecting element which may be produced rapidly and in great number at low effort and cost, while being reliable and lightweight and having sufficient strength, and for a method for producing such a connecting element.

SUMMARY OF THE INVENTION

Therefore, one idea of the present invention is to provide a connecting element for connecting at least two components of an aircraft or spacecraft structure, in particular a connecting element which is suitable for connecting a frame to a skin and/or to a stringer of an aircraft or spacecraft structure, which can be manufactured in a significantly more economical and time-saving manner, compared to conventional connecting elements, and which requires significantly fewer tools for the production of connecting elements differing in the details of their shape and/or dimension. At the same time, the connecting element produced should be lightweight and able to sustain predetermined loads applied to it.

Further, it is intended to provide a method for the production of a connecting element for connecting at least two components of an aircraft or spacecraft structure, which makes it possible to produce a considerable number of connecting elements, for example of the order of magnitude needed within the structures of one or more complete aircraft, in a time-saving manner and at reduced cost.

Accordingly, there is provided a method for the production of a connecting element for connecting at least two components of an aircraft or spacecraft structure, in particular for connecting a frame to a skin and/or to a stringer of an aircraft or spacecraft structure. The method comprises the following:

A hollow initial profile is formed, the initial profile comprising a wall which follows a closed path in a cross-section of the initial profile. The wall is formed with a first, a second and a third section, these sections being provided along the closed path in such a manner that, in the direction of the closed path, the second section is provided between the first and third sections. This means that, along the closed path, the first section is followed by the second section, and the second section is followed by the third section.

Material which initially forms part of the wall in at least one region of the initial profile is removed. The removal of material is performed in such a manner as to obtain at least one opening in the at least one region, the at least one opening extending at least partially within the first section.

A portion of the second section and a portion of the third section form part of the connecting element which is to be produced by means of the method, and these portions of the second and third sections are each formed so as to be adapted, when the connecting element is finished, to at least partially abut against a respective component of the components of the structure to be connected.

In the method provided in this application, the formation of the at least one opening is performed in such a manner that material which initially forms part of the wall in the first section of the initial profile and which remains after the formation of the at least one opening forms at least one stabilizing section. Further, the formation of the at least one opening is performed in such a manner that the at least one stabilizing section connects the portions of the second and third sections.

Further, there is provided a connecting element for connecting at least two components of an aircraft or spacecraft structure, in particular for connecting a frame to a skin and/or to a stringer of an aircraft or spacecraft structure. The connecting element preferably is obtainable by performing the method of the invention. The connecting element is formed with a shape which can be obtained from a hollow initial profile comprising a wall which follows a closed path in a cross-section of the initial profile, wherein the wall is formed with a first, a second and a third section that are provided along the closed path in such a manner that, in the direction of the closed path, the second section is provided between the first and third sections. The shape with which the inventive connecting element is formed can be obtained by providing at least one opening in at least one region of this initial profile, the at least one opening extending at least partially within the first section. Further, a portion of the second section and a portion of the third section form interface portions of the connecting element and are each adapted to at least partially abut against a respective component of the components of the structure to be connected. The at least one opening is formed in such a manner that material forming part of the wall in the first section of the initial profile and located outside of the at least one opening forms at least one stabilizing section that connects the portions of the second and third sections.

In addition, an aircraft or a spacecraft, in particular an airplane, is provided which comprises at least one connecting element as proposed by the present invention, and at least two structural components, wherein the at least two structural components are connected to each other by means of the connecting element.

The idea underlying the present application is that the connecting element is conceived in such a manner that its shape can be obtained by first providing a hollow initial profile from which, subsequently, material initially forming part of the wall of the hollow profile is removed. The removal of material further defines the shape of the connecting element by the formation of an opening and of a stabilizing element which enables the connecting element to better sustain loads applied to the connecting element when the connecting element abuts against each of the at least two components of the aircraft or spacecraft structure which are to be connected. For example, when the connecting element of the invention is used to connect a ring frame segment to a fuselage skin of an aircraft fuselage structure, the stabilizing element may in advantageous manner be used to stabilize the connecting element against loads applied thereto along the longitudinal direction of the aircraft fuselage.

The present application renders it possible to produce such a connecting element in a very economical and time-saving way. The manufacturing process is significantly simplified as the hollow initial profile to be formed at first can be obtained in a rather simple and efficient manner. The hollow initial profile may, in principle, be made from any suitable material and may be produced by any process suitable for forming hollow profiles.

The connecting element and the method proposed in this application further make it possible to significantly reduce the number of different tools necessary for producing a given set of differently shaped connecting elements. For example, the shape, dimension and/or position of the stabilizing section of the connecting element can be varied in a very simple manner by varying the step of removing material that initially forms part of the wall in the at least one region. In other words, variations in shape, dimensions or position of the stabilizing section can be easily obtained by varying the shape and position as well as the dimensions of the at least one region in which material is removed, and thus varying the shape, position and/or dimensions of the at least one opening that is formed.

Although the connecting element may be formed from various materials including metals and metal alloys, like aluminum or aluminum alloys, the invention has particular advantages when the hollow initial profile is formed from a fiber-reinforced composite material. Hollow profiles of such a material can be formed in a relatively simple and cost-effective manner, compared to workpieces having more complex shapes. When forming a hollow profile, it can be ensured in relatively simple manner that the reinforcing fibers or fiber bundles are correctly positioned and arranged. A deformation process of a fiber-reinforced material can be avoided in the present application.

The term "opening" as it is used in the context of this application is intended to encompass not only openings and apertures that are surrounded, along a circumference thereof, by the material of the workpiece in which the "opening" has been formed, but is intended to include also openings that extend from an edge of the workpiece into the workpiece. This means that, in particular, an opening in the sense of this term may also, for example, extend in recess-like manner from an edge of the wall at an end of the initial profile or of a piece thereof into the wall.

Advantageous developments and improvements of the connecting element and the method as well as the aircraft or spacecraft according to the application are contained in the dependent claims as well as in the detailed description, which refers to the figures of the drawings.

According to an advantageous development of the method, the initial profile is formed with a length corresponding to at least twice, preferably to at least several times, the length of the connecting element to be produced. According to this development, further, at least one piece of the initial profile is separated therefrom after the at least one opening has been formed, in order to form the connecting element from the piece. In this manner, it may be simpler to remove the material in the at least one region in order to form the at least one opening as the removal of material can be performed on the initial profile. Subsequently, a piece of the initial profile can be separated from the initial profile which has approximately a length of the connecting element to be produced.

According to a further development of the method, material that initially forms part of the wall in a plurality of regions of the initial profile is removed. This removal of material is performed in such a manner that a plurality of openings is obtained. The openings are spaced from each other and each extend at least partially within the first section, the formation of the openings being performed in such a manner that material initially forming part of the wall in the first section of the initial profile and remaining after the formation of the plurality of openings forms a plurality of stabilizing sections. These stabilizing sections connect the third section and the second section of the initial profile. A plurality of pieces of the initial profile are separated therefrom in such a manner that the respective portions of the second and third sections which form part of each of the pieces remain connected by at least one of the stabilizing sections, in order to form a connecting element from each of the pieces. This variant of the invention is particularly advantageous as it enables the efficient production of a plurality of individual connecting elements from the initial profile. In an economical and cross-effective way, after the formation of the initial profile—which may be formed with a length of several of the connecting elements to be produced, or which may also be formed as an endless initial profile—the plurality of openings may first be formed in the initial profile, and then the pieces which are intended to afterwards form the connecting elements can be separated one after the other from the initial profile.

According to a further advantageous improvement of the method, the pieces of the initial profile are each separated therefrom in such a manner that on both sides of one of the stabilizing sections which becomes part of a piece, a portion of each of those openings adjacent to this stabilizing section remains in the respective piece. In this way, it is possible to make use of one opening of the plurality of openings for shaping consecutive stabilizing sections, which enables an efficient production of a great number of connecting elements.

According to an advantageous development of the connecting element, at least two openings are provided in at least two regions of the initial profile in such a manner that a respective one of the at least two openings is provided on either side of the stabilizing section. Each of the openings extends at least partially within the first section. Thereby, the stabilizing section can be shaped on both sides and its position can be varied along the connecting element.

According to another preferred development of the method of the invention, the openings are formed with a substantially identical shape and with a substantially constant spacing along the direction of the length of the initial profile. In this development, a plurality of substantially identically shaped pieces are separated from the initial profile in order to produce a plurality of substantially identically shaped connecting elements. Thereby, the production of the connecting elements becomes even more economical and cost-effective. This development is particularly advantageous when a great number of identically shaped connecting elements are required.

In a variant, some or all of the openings are shaped differently from each other. In this way, a number of differently shaped connecting elements, in which the stabilizing sections have different dimension, different position or varying shape, can be produced from a single initial profile. Advantageously, the differently shaped openings can be formed in a first step, for example along the entire length of the initial profile, and then in a second subsequent step, the pieces can be separated from the initial profile one after the other in order to rapidly produce a plurality of differently shaped connecting elements.

According to another development of the method, the initial profile is formed with a length corresponding to at least twice, preferably to at least several times, the length of the connecting element to be produced, at least one piece of the initial profile being separated therefrom. According to this development, the at least one opening is formed subsequently within the piece in order to form the connecting element from the piece. This makes it possible to first form a piece of the initial profile which, for example, has a length approximately equal to the length of the connecting element to be produced, and to shape the stabilizing section afterwards by forming the at least one opening. This may have the advantage that the removal of material can be performed on a piece having a size smaller than that of the entire initial profile.

In a development, at least two openings are formed in at least two regions of the piece, the formation of the two openings being performed in such a manner that a respective one of the at least two openings is provided on either side of the stabilizing section. In this way, the stabilizing section may be provided at any position along the connecting element formed from the piece, and can be shaped from both sides. In contrast, it can be sufficient to form only one opening within the piece when the stabilizing section should be positioned at one of the ends of the connecting element.

According to a further variant of the connecting element and the method of the invention, the at least one opening or each of the openings is formed as an aperture enabling access to an interior of the initial profile from an outside thereof. In particular, this aperture enables access to inner faces of the second and third sections of the wall, or of the portions of these sections. The aperture is formed by machining of the wall, in particularly by milling, or by cutting the wall, in particular by means of a laser beam or a water jet. This development is advantageous with respect to attaching interface portions of the connecting element to the components to be joined, for example by means of rivets. Forming the opening or the openings by milling, by laser beam cutting or by water jet cutting allows efficient and rapid production of the connecting elements, and the formation of the opening or the openings may, for example, be performed in a completely or partially automated manner.

According to a further improvement of the connecting element and the method of the invention, the at least one opening is formed to extend entirely within the first section. This may be useful when it is desired that the interface portions of the connecting element, formed by portions of the second and third section, have a large area.

According to another improvement of the connecting element and the method of the invention, the initial profile is formed in such a manner that the closed path has substantially the shape of a polygon, in particular of a triangle or of a trapezoid. Herein, the first, second and third sections of the wall form consecutive sides of the polygon in the cross-section of the initial profile. This is particularly advantageous if the connecting element is to be provided with interface portions that are intended to abut against the components to be joined. In a connecting element according to this improvement, these interface portions may be provided in angled relation. Such a shape may be advantageous for joining a frame or frame segment to a skin in an aircraft fuselage structure, for example.

In a further improvement of the connecting element and the method according to the invention, the closed path has the shape of a right-angled triangle. This is a shape which may be particularly useful when it is desired to use the connecting element for connecting a frame to a skin of an aircraft fuselage structure.

In a preferred variant, the polygonal shape of the closed path is formed with rounded corners. This is advantageous from a manufacturing point of view, in particular if the hollow initial profile is formed from a fiber-reinforced synthetic material, and beyond this contributes to avoiding large local stresses within the connecting element.

In a preferred improvement of the connecting element and of the method, the initial profile is formed in such a manner that, in the cross-section of the initial profile, an outer surface of the wall forms a circumferential surface of the initial profile.

In another preferred development of the connecting element and the method according to the invention, the first, second and third sections are formed in one piece, the wall being continuous along the closed path. In this way, when the material has been removed to form the at least one opening or the plurality of openings, a stabilizing element or stabilizing elements remain(s) which as well is/are formed in one piece with the portions of the second and third sections that become part of the connecting element. Thereby, a connecting element is provided which avoids internal joints, has a high load bearing capacity and which is suitable for being produced from a fiber-reinforced composite material.

Further preferably, the initial profile may be formed in such a manner that the wall is continuous along the direction of the length of the initial profile, and that in particular, the cross-section of the initial profile is constant along the direction of its length. Such an initial profile may be produced in a particularly simple manner.

The initial profile may, in a development, be formed so as to be straight in the direction of its length, or may, alternatively, be formed so as to be curved in the direction of its length. This makes it possible to further vary the shape of the connecting element obtained.

According to a further development of the connecting element and the method of the invention, the initial profile is produced from a fiber-reinforced synthetic material comprising fibers embedded in a matrix. Thereby, a connecting element formed from a fiber-reinforced synthetic material is obtained. Herein, the at least one opening or the openings is/are preferably formed in such a manner that within at least a portion of the at least one stabilizing section or of each of the stabilizing sections fibers are arranged which extend continuously from the second section through the stabilizing section into the third section. Such a connecting element is lightweight and particularly suitable for being used for connecting a frame to a skin and/or to a stringer within an aircraft or spacecraft structure when the skin, the frame and the stringer are made of fiber-reinforced synthetic materials. Fibers extending continuously from the second section through the stabilizing section into the third section provide the connecting element with even more strength and stability.

According to a further development, the fiber-reinforced synthetic material comprises a matrix formed with an epoxy resin, into which carbon fibers are embedded. In other variants, the fibers used may be glass fibers or aramid fibers, while the matrix may also be formed with a phenolic resin. However, it is preferred to use a carbon fiber-reinforced epoxy resin for forming the initial profile.

According to a preferred development, the initial profile may be formed by placing a fiber prepreg or several fiber prepregs in the form of a layer of reinforcing fibers, a non-crimp fabric of reinforcing fibers and/or a woven fabric of reinforcing fibers, preimpregnated with an uncured or only partially cured matrix material, onto a core, and subsequently curing the matrix material.

In another variant, the initial profile may be formed by winding and/or braiding fibers or fiber bundles onto a core, in particular by braiding preimpregnated fiber bundles onto the core. In other variants, dry fiber bundles may be wound or braided onto the core, or a dry woven fabric or a dry non-crimp fabric may be placed as layers onto the core; in this case, the fibers can subsequently be infiltrated with resin which is cured afterwards.

The improvements, developments and enhancements described above may be arbitrarily combined with each other whenever this makes sense. Other possible developments, enhancements and implementations of the invention comprise combinations of features of the invention that have been described above or will be described in the following in relation to the detailed description of embodiments, even where such a combination has not been expressly mentioned.

BRIEF DESCRIPTION OF THE DRAWINGS

The present invention will be explained in the following with reference to the schematic figures of the drawings, illustrating embodiments of the invention.

The enclosed drawings are intended to illustrate embodiments of the invention so that the invention may be further understood. The drawings, in conjunction with the description, serve to explain principles and concepts of the invention. Other embodiments and many of the advantages described may be inferred from the drawings. Elements of the drawings are not necessarily drawn to scale.

Elements, features and components which are identical or which have the same function or effect have been labeled in the drawings using the same reference signs, except where explicitly stated otherwise.

DETAILED DESCRIPTION OF THE PREFERRED EMBODIMENTS

A method for the production of a connecting element 12 in accordance with one embodiment of the present invention will be described in the following with reference to FIGS. 1-4.

Figure 1:
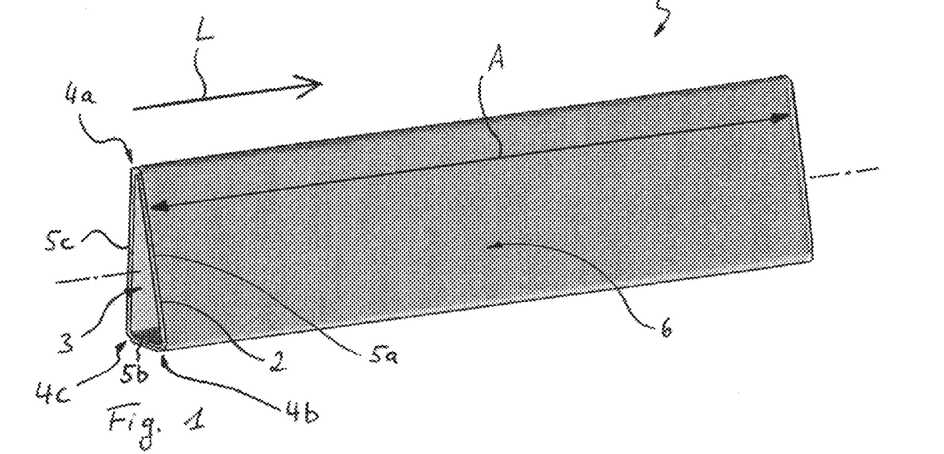
FIG. 1 is a perspective view of a hollow initial profile in accordance with an embodiment.

First, a hollow initial profile 1 is formed. As illustrated in FIG. 1, the initial profile 1, extending along a longitudinal direction L (the direction of the length of the initial profile 1), is formed with a cross-section that is substantially constant along the direction L, and comprises a wall 2 as well as an interior 3. Along the direction L of the length of the initial profile 1, the wall 2 is continuous.

Figure 2:
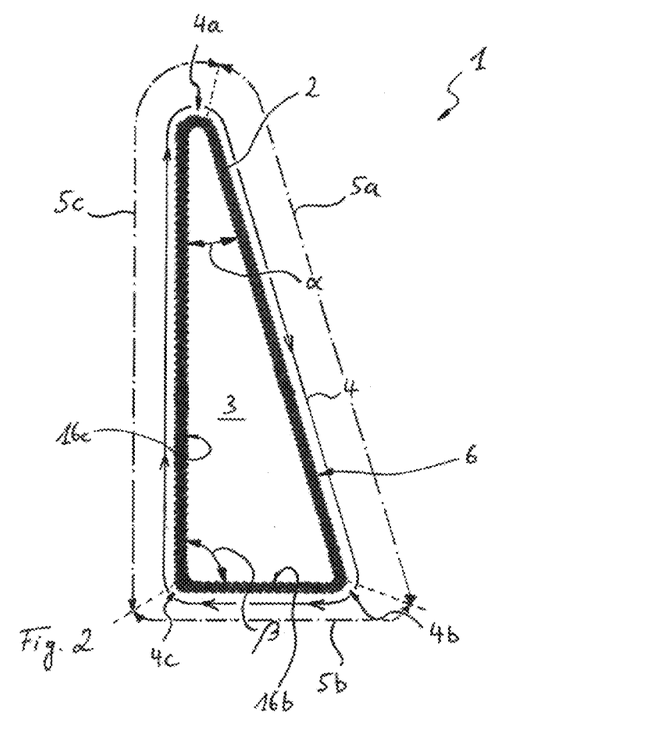
FIG. 2 shows a cross-section of the hollow profile of FIG. 1.

FIG. 2 shows a cross-section of the initial profile 1 of FIG. 1, taken transversely to the direction L. As FIG. 2 shows, the wall 2 follows, in the cross-section depicted, a closed path 4. In FIG. 2, the closed path 4 has substantially the shape of a triangle with rounded corners, whereby the initial profile 1 is provided with rounded edges 4a, 4b and 4c.

The wall 2 comprises a first section 5a, a second section 5b and a third section 5c which are provided along the closed path 4, the second section 5b being arranged, along the path 4, between the first and third sections 5a, 5c. As shown in FIG. 2, the first section 5a, the second section 5b and the third section 5c of the wall 2 are formed in one piece with each other and form consecutive sides of the triangular shape.

The initial profile 1 is formed, regarding its cross-sectional shape, in such a manner that the first and third sections 5a and 5c of the wall 2, which are integrally connected to each other in the region of the rounded edge 4a, form with each other an acute angle α. Further, an angle β, formed by the second section 5b and the third section 5c, which are integrally connected in the region of the rounded edge 4c, corresponds approximately to a right angle. In the region of the rounded edge 4b, the first section 5a and the second section 5b are integrally connected. An entire outer surface 6 of the wall 2 forms a circumferential surface of the initial profile 1.

The hollow initial profile 1, as it is shown in FIG. 1, may be produced from any suitable material, for example from a metal material such as aluminum or an aluminum alloy, a plastic synthetic material or a fiber-reinforced composite material. The initial profile 1 may be produced by extrusion, pultrusion, milling or casting. However, most preferably, the initial profile 1 is produced as a fiber-reinforced composite profile from a fiber-reinforced synthetic material. According to an example, the initial profile 1 is formed from a fiber-reinforced synthetic material having a matrix formed with epoxy resin, in which carbon fibers are embedded. Other fibers which may be used to form the initial profile 1 include glass fibers and aramid fibers. Instead of an epoxy resin, a phenolic resin may be used as a matrix, for example.

The initial profile 1 may be formed by placing prepregs comprising unidirectional layers of fibers, woven fabrics of fibers and/or non-crimp fabrics of fibers preimpregnated with an uncured or only partially cured matrix material onto a core. After placing the prepregs on the core, which is not illustrated in the figures, the matrix material is cured, for example by applying heat and/or pressure. In this way, a finished initial profile 1 is obtained after the core is removed.

Alternatively, the hollow initial profile 1 can be produced as a fiber-reinforced composite profile by winding or braiding preimpregnated fiber bundles onto the core and performing curing afterwards, and/or by winding or braiding dry fiber bundles or placing dry unidirectional fiber layers, layers of dry woven fiber fabric and/or layers of dry non-crimp fiber fabric on the core, and subsequently infiltrating the fibers with resin that is then cured. After curing, the core is removed.

When the initial profile 1 is formed, it is preferred that at least a part of the fibers or fiber bundles extends continuously along the circumference of the initial profile 1. For example, a part of the fibers or fiber bundles may extend along the closed path 4, shown in FIG. 2, running through the first, second and third sections 5a, 5b and 5c.

Figure 3:
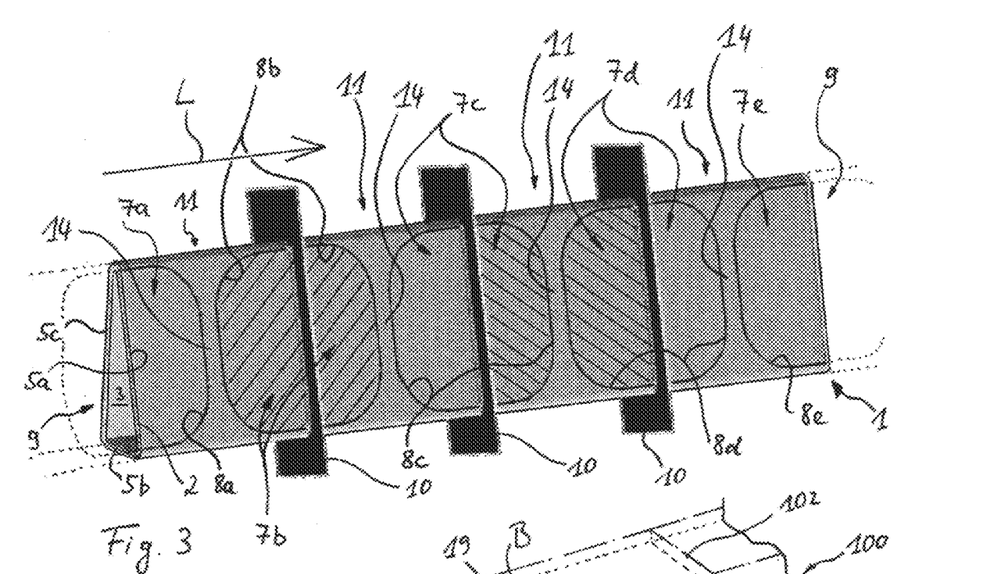
FIG. 3 shows the hollow initial profile illustrated in FIG. 1, regions in which material is to be removed in order to form openings, as well as several cutting planes, being additionally indicated in this figure.

A further stage of the method for the production of connecting elements is schematically depicted in FIG. 3. FIG. 3 shows again the initial profile 1, in perspective view. After the initial profile 1 has been formed, material which initially forms part of the wall 2 in several regions 7a, 7b, 7c, 7d and 7e is removed so as to obtain a plurality of openings 8a to 8e, which are indicated in FIG. 3 by lines illustrating edges of the openings 8a-8e that will be created when the material is removed.

As shown in FIG. 3, the openings 8a-8e entirely extend within the first section 5a of the wall 2. The openings 8b, 8c and 8d are approximately shaped as rectangles with rounded corners. In contrast, both openings 8a and 8e near the ends 9 of the initial profile 1 have shapes each corresponding to approximately one half of one of the openings 8b, 8c or 8d, these being substantially identically shaped. It should be noted that the shapes of the openings 8a-8e in FIG. 3 correspond to preferred examples, and that many other shapes may be chosen if desired.

After the material initially forming part of the wall 2 in the regions 7a-7e has been removed and the openings 8a-8e thereby have been formed, the initial profile 1 is cut along cutting planes 10, schematically indicated in FIG. 3, so as to obtain a plurality of pieces 11, from each of which a connecting element 12 is produced. If necessary or desired, after cutting the pieces 11 from the initial profile 1, cut edges of the pieces 11 may be deburred and/or sealed. The initial profile 1 may be cut along the planes 10 by means of a laser beam, a water jet or in any other suitable way.

Figure 4:
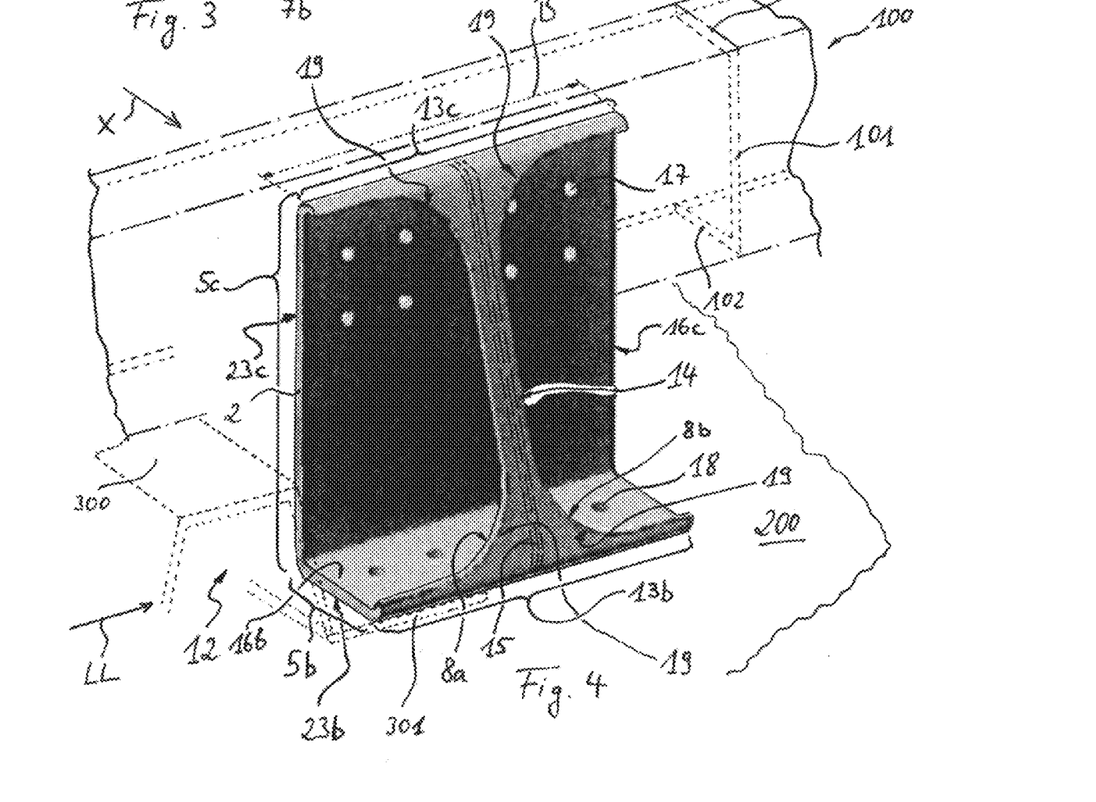
FIG. 4 shows a perspective view of a connecting element in accordance with the embodiment of FIGS. 1-3.

One of the connecting elements 12, being produced from one of the pieces 11 obtained as described with reference to FIG. 3, is shown in FIG. 4. A portion 13b of the second section 5b of the wall 2 as well as a portion 13c of the third section 5c of the wall 2 form part of the connecting element 12. These portions 13c, 13b are each adapted to at least partially abut against a respective one of at least two components of a structure which are to be connected.

In the embodiment shown in FIG. 4, the portion 13b of the second section 5b is adapted to abut, with its outer face 23b, against a skin 200 (shown only schematically and in part in the Figure) of an aircraft fuselage structure, or against stringer feet 301 of stringers 300 arranged on such a skin 200, for example. Additionally, the portion 13c of the third section 5c is adapted to abut, with its outer face 23c, against a web 101 of a frame 100 of the aircraft fuselage structure, in particular against a web 101 of a ring frame segment.

In FIG. 4, the frame 100 is indicated in exemplary manner by a dash-dotted line, and is only partially illustrated. In addition to the web 101, the frame 100 comprises flanges 102 extending from both ends of the web 101, in the manner of a C-profile.

As shown, the formation of the openings 8a to 8e is performed in such a way that material initially forming part of the wall 2 in the first section 5a of the initial profile 1, which remains after the formation of the openings 8a-8e, forms several stabilizing sections 14. In FIG. 4, in exemplary manner, material initially forming part of the wall 2 has been removed to form the openings 8a and 8b, and the remainder of material within the first section 5a of the initial profile 1 forms the stabilizing section 14. The stabilizing section 14 connects the portions 13c and 13b of the third and second sections 5c, 5b. Thus, the stabilizing section 14 forms a stabilizing element that is integral with the portions 13b and 13c of the second and third sections 5b, 5c. Due to the presence of the stabilizing section 14, the connecting element 12 is strengthened and its ability to sustain loads to be transmitted from the frame 100 to the skin 200 along a longitudinal direction X of the aircraft fuselage is increased.

As the connecting element 12 illustrated in FIG. 4 is formed from a fiber-reinforced synthetic material, in particular from carbon fiber-reinforced epoxy resin, the connecting element 12 is lightweight and resistant. While the load-bearing capacity of the connecting element 12 has been increased by providing the stabilizing section 14, the removal of material and thus the formation of the openings 8a and 8b makes it possible to render the connecting element 12 as lightweight as possible, by removing material which is not needed for stabilizing the connecting element 12 in order to support a given, predefined load. The capacity of the stabilizing section 14 to support loads is further enhanced by forming the initial profile 1 and the openings in such a manner, that, when the openings 8a, 8b have been formed, fibers or fiber bundles 15 remain within the stabilizing section 14 which extend continuously from the portion 13b of the second section 5b through the stabilizing section 14 into the portion 13c of the third section 5c, as schematically shown in FIG. 4.

As is further illustrated in FIGS. 3 and 4, in this embodiment, the openings 8a, 8b are formed as apertures which enable access to the interior 3 of the initial profile 1 from an outside thereof. In this manner, inner faces 16b and 16c of the portions 13b and 13c of the second and third sections 5b, 5c, respectively, are easily accessible from the outside of the connecting element 12. This is particularly advantageous with regard to connecting the connecting element 12 to the frame 100 and to the skin 200. As shown in FIG. 4, in order to attach the connecting element 12 to the frame 100, a plurality of holes 17 may be provided for connecting the connecting element 12 to the frame 100 by means of rivets (not shown). Additionally, the connecting element 12 may be provided with holes 18 in the region of the portion 13b of the second section 5b, for attaching the connecting element 12 to the skin 200, either directly or via the stringer feet 301 by means of rivets as well. The riveting procedure is facilitated by the large access apertures formed by the openings 8a and 8b. The holes 17, 18 may be drilled before or after forming the openings 8a-8e, and before or after cutting the initial profile 1 along the cutting planes 10.

In a variant, the connecting element 12 may be adhesively bonded to the frame 100 and/or to the skin 200 or to the stringer feet 301. In this case, the holes 17, 18 may not be necessary.

In the method for the production of the connecting element 12 according to the embodiment of FIGS. 1 to 4, the openings 8a-8e are formed by machining of the wall 2, or by cutting the wall 2. For example, the openings 8a-8e may be milled into the first section 5a of the wall 2, or they may be cut into the wall 2 using a laser beam or a water jet.

Regarding the openings 8a-8e, these are preferably provided with a rounded shape. For example, where the stabilizing section 14 merges into the second section 5b and into the third section 5c, respectively, the openings may, as an example, be provided with a shape corresponding approximately to a quarter of a circle. The rounded regions of the openings 8a, 8b are indicated in FIG. 4 by reference signs 19. Although by the cutting or milling process, used for forming the openings 8a, 8b, a plurality of fibers or fiber bundles extending in the initial profile 1 along the closed path 4 and thus in the circumferential direction of the initial profile 1, are cut in the illustrated embodiment, the remaining continuous fibers 15 make sure that the stabilizing section 14 has the strength required. In contrast, the rounded regions 19 help to avoid large internal stresses in those regions where the stabilizing section 14 merges into the second and third sections 5b, 5c, respectively.

Referring again to the method of the embodiment of FIGS. 1 to 4, in FIG. 3, it is schematically indicated that the initial profile 1 may be formed with a length A, measured along the direction L (see FIG. 1) which approximately corresponds to several times a length B of the connecting element 12 to be produced. In this figure, it is further indicated how the initial profile 1 may instead be formed as an endless profile from which the pieces 11 are cut, along the cutting planes 10, either after or before forming the openings 8a-8e.

The openings 8a-8e may, as described, be introduced into the initial profile 1 by milling or cutting, before pieces 11 are cut along the cutting planes 10 from the initial profile. However, these steps may also be performed in reverse order, which means that after forming the initial profile 1, pieces 11 are first cut from the initial profile 1, along the cutting planes 10, and that afterwards, the portions of the openings 8a-e which are associated with the respective piece 11 are formed in the respective piece 11 in order to form the connecting element 12, as it is shown in FIG. 4. The hatching in FIG. 3 is intended to indicate, in exemplary manner, how the opening 8b is formed by removing material in the region 7b as a whole and in one step, when the material is removed in order to form the opening 8b before the pieces 11 are cut from the initial profile 1, while the hatched areas of the openings 8c and 8d are intended to indicate how the respective portions of these openings 8c, 8d are formed in a piece 11 which before has been cut from the initial profile 1.

In a manner similar to what is shown in FIG. 3, the openings 8a-8e may be formed with a substantially identical shape and with substantially constant spacing along the direction L of the length of the initial profile 1 in order to form a plurality of substantially identically shaped connecting elements 12. In case the initial profile 1 is not formed endlessly, it may be that only at ends 9 of the initial profile 1, openings 8a, 8e have to be shaped differently from the other openings, for example, as illustrated, in the shape of one half of each of the openings 8b, 8c, 8d (FIG. 3).

Figure 5:
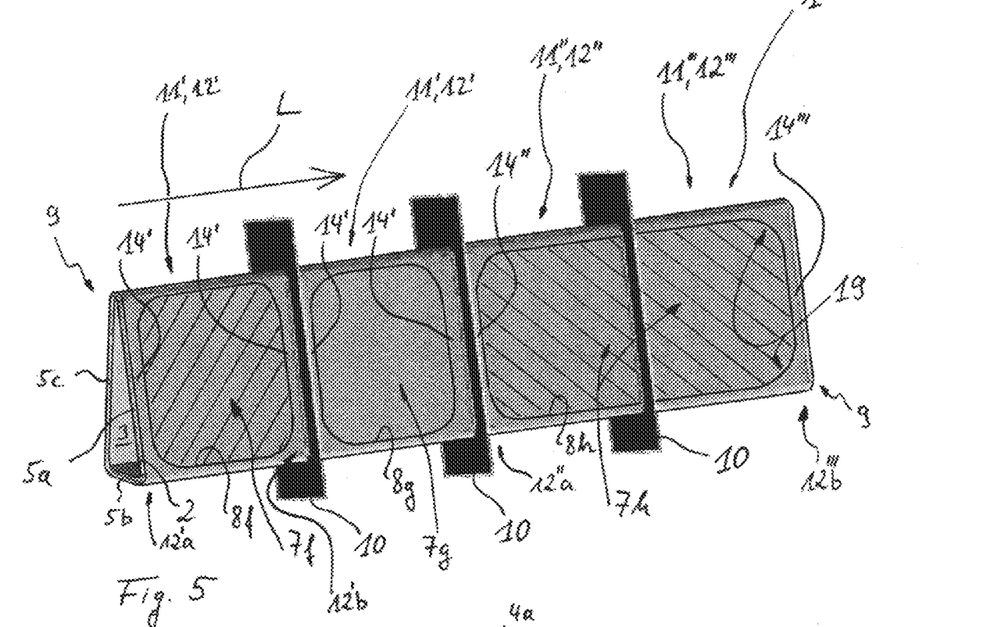
FIG. 5 is a perspective view of a hollow initial profile illustrating a further embodiment of the method for the production of a connecting element, as well as connecting elements according to further embodiments.

While the connecting element 12 shown in FIG. 4 is shaped such as to be symmetrical with respect to the direction LL, corresponding to the direction L of the initial profile 1, the stabilizing element 14 in other embodiments may be arranged differently within the connecting element. Methods for forming connecting elements 12', 12", 12' according to other embodiments are schematically illustrated in FIG. 5. For example, openings 8f and 8g may be formed in the first section 5a of the wall 2, and pieces 11' may then be cut from the initial profile 1 in order to form connecting elements 12' each having two stabilizing sections 14' at the ends 12a', 12b' of the connecting element 12'. Alternatively, as also shown in FIG. 5 in exemplary manner, an opening 8h may be formed in the first section 5a of the wall 2 which afterwards can be cut, for example, in its middle in such a manner that two connecting elements 12", 12' are obtained which each comprise a stabilizing section 14", 14', respectively, that are each asymmetrically arranged at an associated end 12a", 12b" of the connecting element 12", 12', as sketched in FIG. 5.

Figure 6:
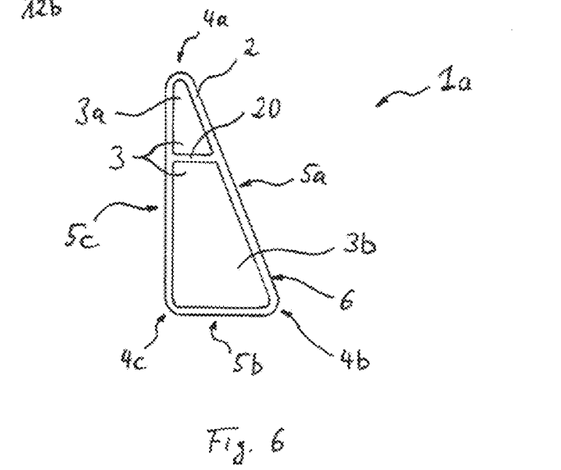
FIG. 6 is a cross-section of a hollow initial profile according to a still further embodiment.

Although the embodiments illustrated in FIGS. 1-5 make use of an initial profile 1 that comprises a wall 2 of substantially triangular cross-section, as sketched in FIG. 2, other cross-sections of the wall 2 are conceivable. For example, in cases where it is desired that the connecting element 12 be formed so as to be even more rigid and strong, an initial profile 1a may be formed with an intermediate wall 20, dividing the interior 3 of the initial profile 1a into two cells 3a, 3b. This is schematically illustrated in FIG. 6. It is to be noted that, for the context of the present application, the initial profile 1a shown in cross-section in FIG. 6 is to be understood, in the same manner as sketched in FIG. 2, as comprising a wall 2 following a closed path 4, and further comprising the additional, intermediate wall 20. The intermediate wall 20 preferably is formed integrally with the wall 2. When the openings 8a-h are formed, a part of the material initially forming the intermediate wall 20 may be removed as well, but it is then preferred that another part of the intermediate wall 20 remains within the finished connecting element 12 and that the portion 13c remains connected to the stabilizing section 14 via the remaining part of the intermediate wall 20. Such a connecting element 12 may be particularly resistant to buckling of the portion 13c and of the stabilizing section 14.

Although the invention has been completely described above with reference to preferred embodiments, the invention is not limited thereto but may be modified in various ways.

In particular, the cross-sectional shape of the wall 2 and thus the shape of the closed path 4 may be varied in many ways. The angles α, β may be chosen in appropriate manner in order to adapt the connecting element 12 to the particular configuration of the components which are to be connected by the connecting element 12. Also, the angle α may be increased if it is desired to make the second section 5b wider and thus to provide more space for attaching the connecting element 12 to one of the components, such as the skin 200, for example by means of two rows of rivets instead of one row only.

Moreover, although the embodiments above show the stabilizing section 14 to extend approximately parallel to the cutting planes 10 and thus to end faces of the connecting element 12, it is conceivable to shape the openings on either side of the stabilizing section 14 in such a manner that the stabilizing section 14 extends at an angle with respect to the cutting planes 10, for example, if this is desired considering the forces to be supported.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft or spacecraft,
wherein the aircraft or spacecraft comprises at least one connection element for connecting at least two components of an aircraft or spacecraft structure,
the connecting element being formed with a shape that can be obtained from a hollow initial profile comprising a wall which follows a closed path in cross-section of the initial profile, the wall being formed with a first, a second and a third section provided along the closed path in such a manner that, in the direction of the closed path, the second section is provided between the first and third sections, at least one opening being provided in at least one region of the initial profile, the at least one opening extending at least partially within the first section,
wherein a portion of the second section and a portion of the third section form interface portions of the connecting element and are each adapted to at least partially abut against a respective component of the components of the structure,
wherein the at least one opening is formed in such a manner that material forming part of the wall in the first section of the initial profile and outside of the at least one opening forms at least one stabilizing section which connects the portions of the second and third sections, and
wherein the stabilizing section is asymmetrically arranged at an associated end of the connecting element;
wherein the aircraft or spacecraft comprises a skin stiffened by a frame and a stringer, and wherein the frame crosses about the stringer and is connected to the skin by the connecting element.

2. The aircraft or spacecraft according to claim 1, wherein the connecting element is directly attached to the skin.

3. The aircraft or spacecraft according to claim 1, wherein the connecting element is attached to the skin via stringer feet of stringers arranged on the skin.

4. The aircraft or spacecraft according to claim 1, wherein the closed path has substantially the shape of a polygon, the first, second and third sections of the wall forming consecutive sides of the polygon in the cross-section of the initial profile.

5. The aircraft or spacecraft according to claim 1, wherein the connecting element is produced from a fiber-reinforced synthetic material comprising fibers embedded in a matrix, wherein the at least one opening is formed in such a manner that within at least a portion of the at least one stabilizing section fibers are arranged which extend continuously from the second section through the stabilizing section into the third section.

* * * * *